(12) United States Patent
Patwardhan et al.

(10) Patent No.: US 9,491,094 B2
(45) Date of Patent: Nov. 8, 2016

(54) PATH OPTIMIZATION IN DISTRIBUTED SERVICE CHAINS IN A NETWORK ENVIRONMENT

(71) Applicant: Cisco Technology, Inc., San Jose, CA (US)

(72) Inventors: Sourabh Suresh Patwardhan, Santa Clara, CA (US); Maithili Narasimha, Sunnyvale, CA (US); Suraj Nellikar, Santa Clara, CA (US)

(73) Assignee: CISCO TECHONOLOGY, INC., San Jose, CA (US)

( * ) Notice: Subject to any disclaimer, the term of this patent is extended or adjusted under 35 U.S.C. 154(b) by 204 days.

(21) Appl. No.: 14/037,143

(22) Filed: Sep. 25, 2013

(65) Prior Publication Data

US 2015/0089082 A1    Mar. 26, 2015

(51) Int. Cl.
*H04L 12/721* (2013.01)
*H04L 12/727* (2013.01)
*H04L 12/725* (2013.01)

(52) U.S. Cl.
CPC ............. *H04L 45/44* (2013.01); *H04L 45/121* (2013.01); *H04L 45/308* (2013.01)

(58) Field of Classification Search
CPC ....... H04L 41/00; H04L 43/00; H04L 51/00; H04L 61/00; H04L 65/00; H04L 67/00; H04L 69/00; H04L 45/44; H04L 61/2567; H04L 45/121; H04L 45/308
See application file for complete search history.

(56) References Cited

U.S. PATENT DOCUMENTS

| | | | |
|---|---|---|---|
| 4,769,811 A | 9/1988 | Eckberg et al. | |
| 7,644,182 B2 | 1/2010 | Banerjee | |
| 7,738,469 B1 | 6/2010 | Shekokar et al. | |
| 7,814,284 B1 | 10/2010 | Glass et al. | |
| 8,094,575 B1* | 1/2012 | Vadlakonda | H04L 45/123 370/252 |
| 2004/0109412 A1* | 6/2004 | Hansson | H04L 47/10 370/229 |
| 2005/0204042 A1 | 9/2005 | Banerjee | |

(Continued)

FOREIGN PATENT DOCUMENTS

WO    WO2015/073190    5/2015

OTHER PUBLICATIONS

P. Quinn, Network Service Header, Jun. 13, 2013, The Internet Engineering Task Force, Network Working Group.*

(Continued)

*Primary Examiner* — Wing F Chan
*Assistant Examiner* — Billy H Ng
(74) *Attorney, Agent, or Firm* — Patent Capital Group

(57) ABSTRACT

An example method for path optimization in distributed service chains in a network environment is provided and includes receiving information about inter-node latency of a distributed service chain in a network environment comprising a distributed virtual switch (DVS), where the inter-node latency is derived at least from packet headers of respective packets traversing a plurality of service nodes comprising the distributed service chain, and modifying locations of the service nodes in the DVS to reduce the inter-node latency. In specific embodiments, the method further includes storing and time-stamping a path history of each packet in a network service header portion of the respective packet header. A virtual Ethernet Module (VEM) of the DVS stores and time-stamps the path history and a last VEM in the distributed service chain calculates runtime traffic latencies from the path history and sends the calculated runtime traffic latencies to a virtual supervisor module.

20 Claims, 5 Drawing Sheets

(56) References Cited

U.S. PATENT DOCUMENTS

| | | | |
|---|---|---|---|
| 2005/0289244 A1 | 12/2005 | Sahu et al. | |
| 2008/0177896 A1* | 7/2008 | Quinn | G06F 9/5055 709/238 |
| 2008/0181118 A1 | 7/2008 | Sharma | |
| 2008/0209039 A1 | 8/2008 | Tracey et al. | |
| 2009/0003364 A1 | 1/2009 | Fendick et al. | |
| 2011/0023090 A1 | 1/2011 | Asati et al. | |
| 2011/0255538 A1* | 10/2011 | Srinivasan | H04L 41/0893 370/392 |
| 2012/0131662 A1* | 5/2012 | Kuik | G06F 9/45558 726/11 |
| 2013/0003735 A1 | 1/2013 | Chao et al. | |
| 2013/0124708 A1 | 5/2013 | Lee | |
| 2013/0163594 A1 | 6/2013 | Sharma | |
| 2013/0163606 A1 | 6/2013 | Bagepalli et al. | |
| 2013/0272305 A1 | 10/2013 | Lefebvre et al. | |
| 2014/0036730 A1* | 2/2014 | Nellikar | H04L 49/70 370/255 |
| 2014/0105062 A1 | 4/2014 | McDysan | |
| 2014/0254603 A1 | 9/2014 | Banavalikar | |
| 2014/0279863 A1* | 9/2014 | Krishnamurthy | G06F 17/3005 707/609 |
| 2014/0280836 A1 | 9/2014 | Kumar et al. | |
| 2015/0012988 A1 | 1/2015 | Jeng et al. | |
| 2015/0052516 A1* | 2/2015 | French | G06F 9/4856 718/1 |
| 2015/0074276 A1* | 3/2015 | DeCusatis | H04L 67/1008 709/226 |
| 2015/0222516 A1* | 8/2015 | Deval | H04L 67/1029 370/253 |

OTHER PUBLICATIONS

PCT Jan. 19, 2015 International Search Report and Written Opinion from International Application Serial No. PCT/US2014/062244.
Kumar, S., et al., "Service Function Path Optimization: draft-kumar-sfc-sfp-optimization-00.txt," Internet Engineering Task Force, IETF; Standard Working Draft, May 10, 2014.
"Digital Program Insertion," from Wikipedia, the free encyclopedia, Jan. 2, 2012; 1 page http://en.wikipedia.org/w/index.php?title=Digital_Program_Insertion&oldid=469076482.
"Dynamic Adaptive Streaming over HTTP," from Wikipedia, the free encyclopedia, Oct. 25, 2012; 3 pages http://en.wikipedia.org/w/index.php?title=Dynamic_Adaptive_Streaming_over_HTTP& oldid=519 749189.
"G-Streamer and in-band Metadata," from RidgeRun Developer Connection, Jun. 19, 2012; 5 pages; https://developer.ridgerun.com/wiki/index.php/GStreamer_and_in-band_metadata.
"ISO/IEC JTC 1/SC 29, Information Technology—Dynamic Adaptive Streaming over HTTP (DASH)—Part 1: Media Presentation Description and Segment Formats," International Standard ©ISO/IEC 2012—All Rights Reserved; Jan. 5, 2012; 131 pages.
"M-PEG 2 Transmission," ©Dr. Gorry Fairhurst, 9 pages [Published on or about Jan. 12, 2012] http://www.erg.abdn.ac.uk/future-net/digital-video/mpeg2-trans.html.
"MPEG Transport Stream," from Wikipedia, the free encyclopedia, Nov. 11, 2012; 7 pages http://en.wikipedia.org/w/index.php?title=MPEG_transport_stream&oldid=522468296.
Wong, F., et al., "SMPTE-TT Embedded in ID3 for HTTP Live Streaming, draft-smpte-id3-http-live-streaming-00," Informational Internet Draft, Jun. 2012; 7 pages http://tools.ietf.org/html/draft-smpte-id3-http-live-streaming-00.
USPTO Jun. 18, 2015 Non-Final Office Action from U.S. Appl. No. 14/037,210.
Boucadair et al., "Differentiated Service Function Chaining Framework," Network Working Group Internet Draft draft-boucadair-network-function-chaining-03, Aug. 21, 2013.
Quinn, et al., "Network Service Header," Network Working Group Internet Draft draft-quinn-nsh-01, Jul. 12, 2013.
U.S. Appl. No. 14/020,649, filed Sep. 6, 2013, entitled "Distributed Service Chaining in a Network Environment," Inventor(s): Surendra M. Kumar, et al.
U.S. Appl. No. 14/037,210, filed Sep. 25, 2013, entitled "Co-Operative Load Sharing and Redundancy in Distributed Service Chains in a Network Environment," Inventor(s): Maithili Narasimha, et al.
U.S. Appl. No. 14/081,772, filed Nov. 15, 2013, entitled "Shortening of Service Paths in Service Chains in a Communications Network," Inventor(s): Surendra M. Kumar, et al.
"ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.
"CEA-708," from Wikipedia, the free encyclopedia, Nov. 15, 2012; 16 pages http://en.wikipedia.org/w/index.php?title=CEA-708& oldid=523143431.
USPTO Oct. 23, 2015 Non-Final Office Action from U.S. Appl. No. 14/020,649.
USPTO Nov. 23, 2015 Final Office Action from U.S. Appl. No. 14/037,210.
USPTO Aug. 12, 2015 Non-Final Office Action from U.S. Appl. No. 14/081,772.
USPTO Nov. 24, 2015 Notice of Allowance from U.S. Appl. No. 14/081,772.
U.S. Appl. No. 15/055,691, filed Feb. 29, 2016, entitled "Shortening of Service Paths in Service Chains in a Communications Network," Inventor(s): Surendra M. Kumar, et al.
U.S. Appl. No. 14/997,212, filed Jan. 15, 2016, entitled "Leaking Routes in a Service Chain," Inventor(s): Hendrikus G.P. Bosch et al.

* cited by examiner

PATH OPTIMIZATION IN DISTRIBUTED SERVICE CHAINS IN A NETWORK ENVIRONMENT

TECHNICAL FIELD

This disclosure relates in general to the field of communications and, more particularly, to path optimization in distributed service chains in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for path optimization in distributed service chains in a network environment is provided and includes receiving information about inter-node latency of a distributed service chain in a network environment comprising a distributed virtual switch (DVS), where the inter-node latency is derived at least from packet headers of respective packets traversing a plurality of service nodes comprising the distributed service chain, and modifying locations of the service nodes in the DVS to reduce the inter-node latency. In specific embodiments, the method further includes storing and time-stamping a path history of each packet in a network service header portion of the respective packet header. A virtual Ethernet Module (VEM) of the DVS stores and time-stamps the path history and a last VEM in the distributed service chain calculates runtime traffic latencies from the path history and sends the calculated runtime traffic latencies to a virtual supervisor module.

Example Embodiments

Figure 1:
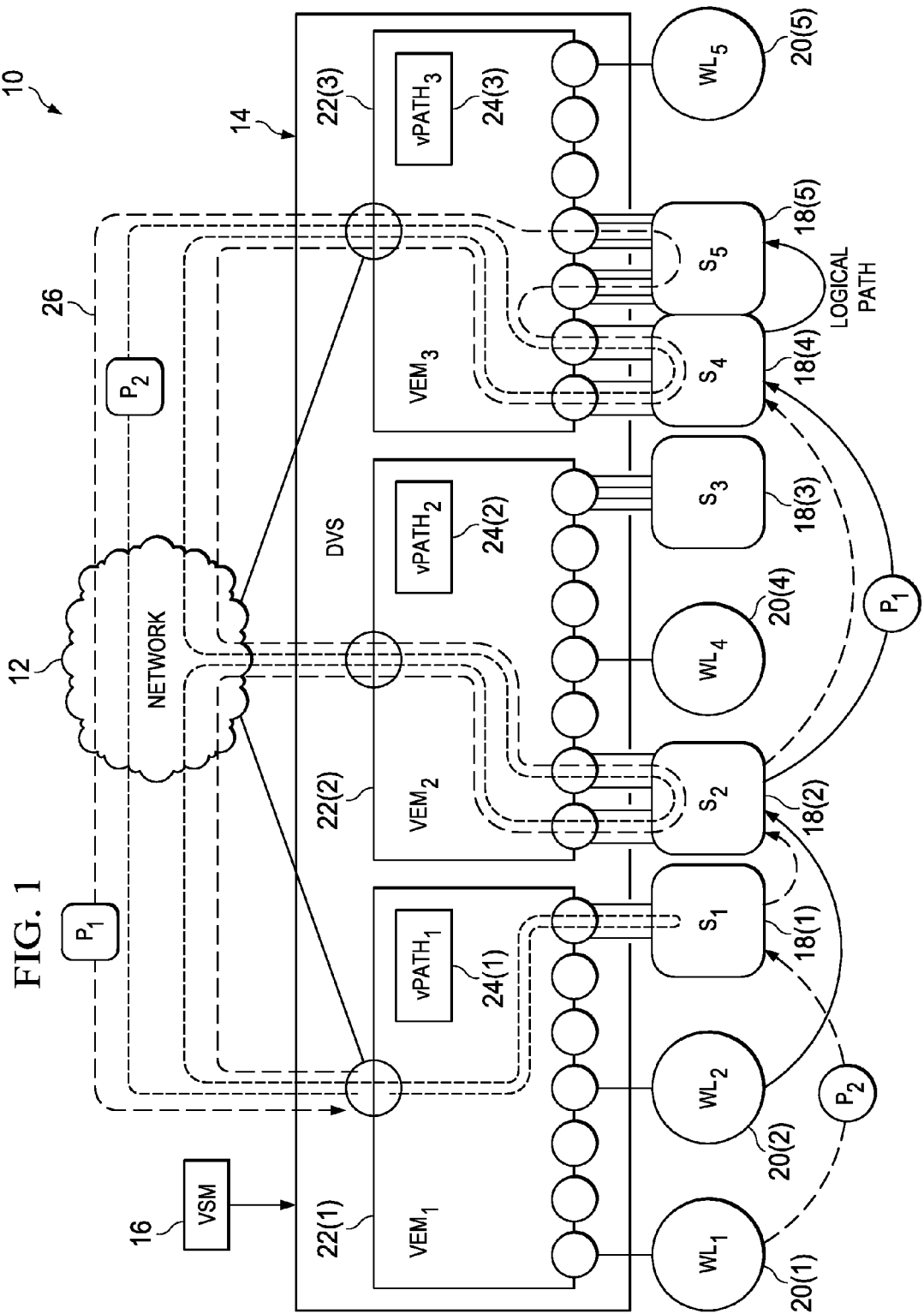
FIG. 1 is a simplified block diagram illustrating a communication system for path optimization in distributed service chains in a network environment.

Turning to FIG. 1, FIG. 1 is a simplified block diagram illustrating a communication system 10 for path optimization in distributed service chains in a network environment in accordance with one example embodiment. FIG. 1 illustrates a network 12 (generally indicated by an arrow) comprising a distributed virtual switch (DVS) 14. A virtual supervisor module (VSM) 16 can manage and control DVS 14. A plurality of service nodes (SN) 18(1)-18(5) may provide various network services to packets entering or leaving network 12. A plurality of virtual machines (VMs) may provide respective workloads (WLs) 20(1)-20(5) on DVS 14, for example, by generating or receiving packets through DVS 14. One or more virtual Ethernet modules (VEMs) 22(1)-22(3) may facilitate packet forwarding by DVS 14. In various embodiments, DVS 14 may execute in one or more hypervisors in one or more servers (or other computing and networking devices) in network 12. Each hypervisor may be embedded with one of VEMs 22(1)-22(3), which can perform various data plane functions such as advanced networking and security, switching between directly attached virtual machines, and uplinking to the rest of the network. Each VEM 22(1)-22(3) may include respective vPaths 24(1)-24(3) that can redirect traffic to SNs 18(1)-18(5) before DVS 14 sends the packets appropriately into WLs 20(1)-20(5).

Note that although only a limited number of SNs, WLs, VEMs, and vPaths are provided in the FIGURE for ease of illustration, any number of service nodes, workloads, VEMs and vPaths may be included in communication system 10 within the broad scope of the embodiments. Moreover, the service nodes and workloads may be distributed within network 12 in any suitable configuration, with various VEMs and vPaths to appropriately steer traffic through DVS 14.

Embodiments of communication system 10 can facilitate path optimization in distributed service chains in network 12. As used herein, the term "service chain" includes an ordered sequence of a plurality of services provided by one or more SNs (e.g., applications, virtual machines, network appliances, and other network elements that are configured to provide one or more network services) in the network. A "service" may include a feature that performs packet manipulations over and beyond conventional packet forwarding. Examples of services include encryption, decryption, intrusion management, firewall, load balancing, wide area network (WAN) bandwidth optimization, application acceleration, network based application recognition (NBAR), cloud services routing (CSR), virtual interfaces (VIPs), security gateway (SG), network analysis, etc. The service may be considered an optional function performed in a network that provides connectivity to a network user. The same service may be provided by one or more SNs within the network. Each service may comprise one or more service functions (e.g., task, such as network address translation (NAT), forwarding (FW), deep packet inspection (DPI), application based packet treatment, etc.; application; compute resource; storage; or content), which singularly or in collaboration with other service functions enable the specific service.

According to some embodiments, a user (e.g., system administrator) can configure the service chains and provision it directly at applicable workloads (e.g., WL 20(1), 20(2), etc.). For example, a service chain P1 may include the following sequence: WL2→S2→S4→S5; another service chain P2 may include the following sequence: WL1→S1→S2→S4. Packets may be sent to service nodes 18(1)-18(5) over service overlay VSM 16 may segment the user configured service chains in DVS 14. According to various embodiments, VSM 16 may determine an "inter-node latency" (e.g., measure of time delay between start of processing at one node, and end of processing at another node) between various service nodes, and reduce the latency, for example, by co-locating service nodes together on the same VEM. Turning to the example of P1 and P2, VSM 16 may determine that both service chains P1 and P2 have a common pattern or dependency namely, path S2→S4. VSM 16 may report a recommendation, or alternatively, configure DSV 14, to move SN 18(2) to VEM 22(3), such that with the new locations, inter-node latency is reduced.

As used herein, the term "VSM" includes a process (e.g., instance of a computer program that is executing) that can provision services at one or more service nodes according to preconfigured settings. The preconfigured settings may be provided at the service controller by a user through an appropriate command line interface, graphical user interface, script, or other suitable means. In some embodiments, VSM 16 may comprise a virtual machine executing on a hypervisor with functionalities similar to a supervisor module on a physical switch. The term "VEM" includes one or more network interfaces, at least some portions of switching hardware and associated firmware and software, and one or more processes managing the one or more network interfaces to facilitate packet switching in a switch, including a distributed virtual switch (e.g., DVS 14). The various VMs, including those executing, implementing, or otherwise facilitating SNs 18(1)-18(5) and WLs 20(1)-20(5) may be connected to the VEM through virtual Ethernet ports (or other suitable interfaces).

vPath 26(1)-26(3) may facilitate intelligent traffic steering (e.g., redirecting traffic from the server requesting the service to the virtual service node; extending a port profile of an interface to include the network services profile); flexible deployment (e.g., enabling each SN 18(1)-18(5) to serve multiple physical servers, with each SN 18(1)-18(5) being hosted on a dedicated to separate server, if appropriate); and network service acceleration (e.g., using network service decision caching, etc.), among other functionalities.

Service overlay 26 encompasses a level of indirection, or virtualization, allowing a packet (e.g., unit of data communicated in the network) destined to a specific workload to be diverted transparently (e.g., without intervention or knowledge of the workloads) to other service nodes as appropriate. Service overlay 26 includes a logical network built on top of existing network 12 (the underlay). Packets are encapsulated or tunneled to create the overlay network topology. For example, service overlay 26 can include a suitable header (called a network service header (NSH)), with corresponding source and destination addresses relevant to the service nodes in the service chain.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Service chaining involves steering traffic through multiple services in a specific order. The traffic may be steered through an overlay network, including an encapsulation of the packet to forward it to appropriate service nodes. Some network architectures, for example that implement advanced vPath capabilities, allow for distributed daisy-chaining of services. The service chains can be of arbitrary length and may comprise various service nodes located on different hosts (e.g., through separate VEMs). The packet processing through the complicated topology of the service nodes in the service chains in such architectures can have a non-trivial impact on end-to-end network path latency and throughput. In addition, the placement of service nodes may be dynamic in a virtualized data center environment, for example, due to live migrations of nodes and initial placement decisions. Such non-static topology can lead to non-deterministic and variable service chain latencies.

Communication system 10 is configured to address these issues (and others) in offering a system and method for path optimization in distributed service chains in a network environment. According to various embodiments, VSM 16 may receive information about inter-node latency of a distributed service chain (e.g., P1) in network 12 comprising DVS 14. The inter-node latency can be derived at least from packet headers of respective packets traversing a plurality of service nodes (e.g., SN 18(2), 18(4), 18(5)) comprising the distributed service chain (e.g., P1), and modifying (e.g., determining, computing, identifying, etc.) locations of the service nodes (e.g., SN 18(2), 18(4), 18(5)) in DVS 14 to reduce the inter-node latency. VSM 16 may aggregate information about the inter-node latencies from a plurality of distributed service chains (e.g., P1, P2) in network 12, and the locations of the service nodes (e.g., 18(1)-18(5)) are determined to reduce the aggregated inter-node latencies.

In specific embodiments, each VEM 22(1)-22(3) may store and time-stamp a path history of each packet in a service platform context field of a network service header (NSH) portion of the respective packet header. In various embodiments, additional information about timestamps and path history may be communicated in other header fields, as appropriate. The "last" VEM in the respective distributed service chain (e.g., VEM 22(3) in the case of both P1 and P2) may calculates runtime traffic latencies from the path history time-stamped in the packet headers of respective packets and sends the calculated runtime traffic latencies to VSM 16. The "last VEM" comprises the specific VEM to which is connected the service node providing the last service listed in the distributed service chain.

In various embodiments, VSM 16 may further identify pairwise dependencies from a policy configuration of each distributed service chain (e.g., P1, P2) in network 12. For example, the pairwise dependencies may be based on a common sequence of service nodes (e.g., P1 and P2 both include a common sequence of S2→S4). In another example, the pairwise dependencies may be based on weighted paths according to service level agreements with corresponding tenants. For example, S2, S4 and S5 may be managed by a common tenant, whereas S1 and S3 may be managed by a different tenant; paths including a sequence of S2, S4 and S5 in the same distributed service chain may be given more weight than paths including a sequence with other service nodes. In yet another example, consider the following example of service chains defined for multiple tenants: S1→S3→S4→S7; S1→S3→S4→S5→S8; and S5→S8→S9. Pairwise dependencies across the service chains include S1→S3→S4; and S5→S8. In various embodiments, the information about inter-node latency used to determine locations of service nodes may include the pairwise dependencies and the measured runtime traffic latencies.

According to some embodiments, VSM 16 may report the modified locations to a log file or other suitable management and/or reporting entity. In other embodiments, VSM 16 may consolidate the service node locations by co-location to the modified locations, live migration to the modified locations, and/or instantiation of new service nodes at the modified locations. For example, at least two service nodes (e.g., S2 and S4) may be co-located at a common VEM (e.g., 22(3) or 22(2)).

Embodiments of communication system 10 may facilitate reduction of path latencies among service nodes in a distributed service chain. A two-pronged approach may be implemented in various embodiments using analysis of policy configurations and runtime traffic latency measurements with network service header fields. For example, in some embodiments, information about packet latencies across service chains may be collected and correlated with identified common service node patterns. The information can be used by VSM 16 to co-locate service nodes 18(1)-18(5) on VEMs 22(1)-22(3), for example, to improve throughput characteristics. Embodiments of communication system 10 can mitigate (e.g., reduce) latency that can arise in wide deployment of distributed service chain architecture in a massively scalable data center (MSDC) network environment. Path optimization techniques, including latency reduction, can allow the MSDC service provider to offer varying levels of service level agreements (SLAs) to tenants.

According to various embodiments, a user may initially configure (e.g., provision, arrange, organize, construct, etc.) the distributed service chains at VSM 16. VSM 16 may discover the initial locations of service nodes 18(1)-18(5). In some embodiments, the distributed service chains may be provisioned by VSM 16 in port profiles at respective vPaths 24(1)-24(3) associated with specific workloads 20 that instantiate the distributed service chains, thereby binding the policy configurations including the distributed service chains with the network policies included in the port profiles.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, services nodes 18(1)-18(5) represent a specific functionality (e.g., provision of a specific service) and may be embodied in one or more physical appliances. For example, some services nodes (e.g., service nodes 18(4) and 18(5)) may be provided in a common network element, whereas some other service nodes (e.g., 18(1) and 18(2)) may be stand-alone network elements that are configured to exclusively provide the respective specific service. Note that although only five service nodes 18(1)-18(5) are illustrated in FIG. 1, any number of service nodes and corresponding services may be provided within the broad scope of the embodiments.

In various embodiments, workload 20 may be separate computing devices running applications (e.g., server/client applications in client-server network architecture). In other embodiments, workload 20 may be separate virtual machines on the same or different computing devices (e.g., server blades in a data center). In some embodiments, workload 20 may include server blades configured in one or more chassis. DVS 14 may include physical and virtual switches and can include any suitable network element capable of receiving packets, and forwarding packets appropriately in a network environment. Any number of workload may be active within network 12 within the broad scope of the embodiments.

VEMs 20 can include virtual interfaces (e.g., virtual equivalent of physical network access ports) that maintain network configuration attributes, security, and statistics across mobility events, and may be dynamically provisioned within virtualized networks based on network policies stored in DVS 14 as a result of VM provisioning operations by a hypervisor management layer. VEMs 22 may follow virtual network interface cards (vNICs) when VMs move from one physical server to another. The movement can be performed while maintaining port configuration and state, including NetFlow, port statistics, and any Switched Port Analyzer (SPAN) session. Although only three VEMs 22(1)-22(3) and vPaths 24(1)-24(3) are illustrated in FIG. 1, any number of VEMs and vPaths may be provided within the broad scope of the embodiments of communication system 10.

In one example embodiment, VSM 16 may be an application executing with DVS 14. In another embodiment, VSM 16 may be a stand-alone application (e.g., provisioned in a suitable network element) separate and distinct from DVS 14 and communicating therewith through appropriate communication links. In some embodiments, VSM 16 may be provisioned in the same local area network as workload 20. In other embodiments, VSM 16 may be provisioned in a different local area network separate and remote from workload 20. VSM 16 may include a graphical user interface (GUI) based controller, or a CLI based controller, or a combination thereof.

Figure 2A:
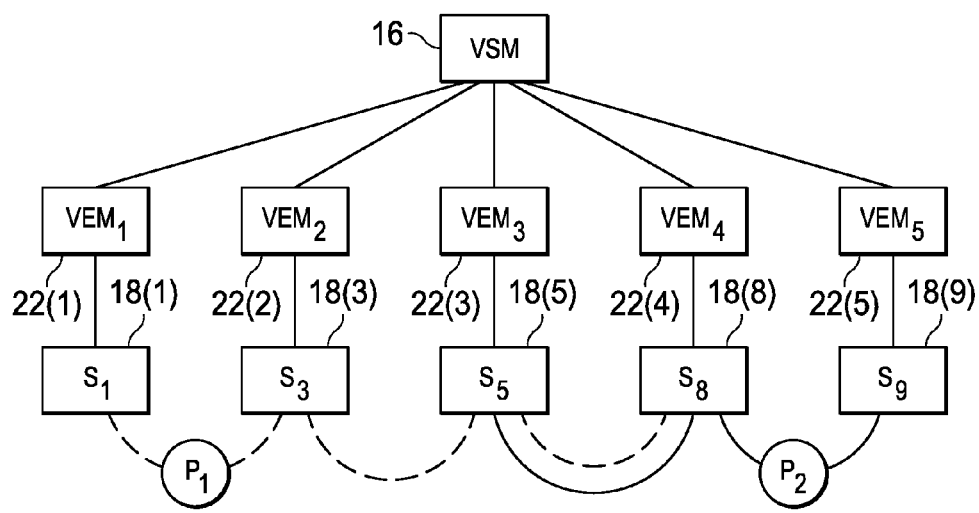
FIG. 2A is a simplified block diagram illustrating example details of an embodiment of the communication system.
Figure 2B:
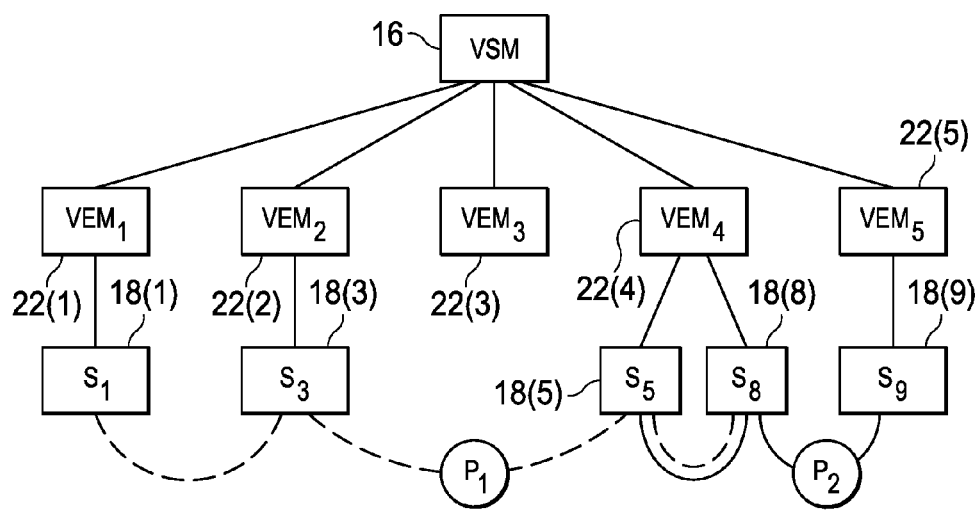
FIG. 2B is a simplified block diagram illustrating other example details of the embodiment of the communication system.

Turning to FIGS. 2A and 2B, FIGS. 2A and 2B are simplified block diagrams illustrating example details that may be associated with an embodiment of communication system 10. According to the example topology, service nodes SN 18(1), 18(3), 18(5), 18(8) and 18(9) may be provisioned at VEM 22(1), 22(2), 22(3), 22(4) and 22(5), respectively. Two example distributed service chains P1 and P2 are illustrated in the figure. P1 starts at SN 18(1), proceeds to SN 18(3), then to SN 18(5) and ends at SN 18(8) (e.g., S1→S3→S5→S8). P2 starts at SN 18(5), proceeds to SN 18(8), and ends at SN 18(9) (e.g., S5→S8→S9). According to various embodiments, VSM 16 may identify a common sub-path of SN 18(5) to SN 18(8) (e.g., S5→S8). Measured traffic latencies may further indicate that the runtime traffic latency between SN 18(5) and SN 18(8) is highest in network 12. VSM 18 may modify the location of SN 18(5) to co-locate it with SN 18(8) at VEM 22(4), as indicated in FIG. 2B.

Figure 3:
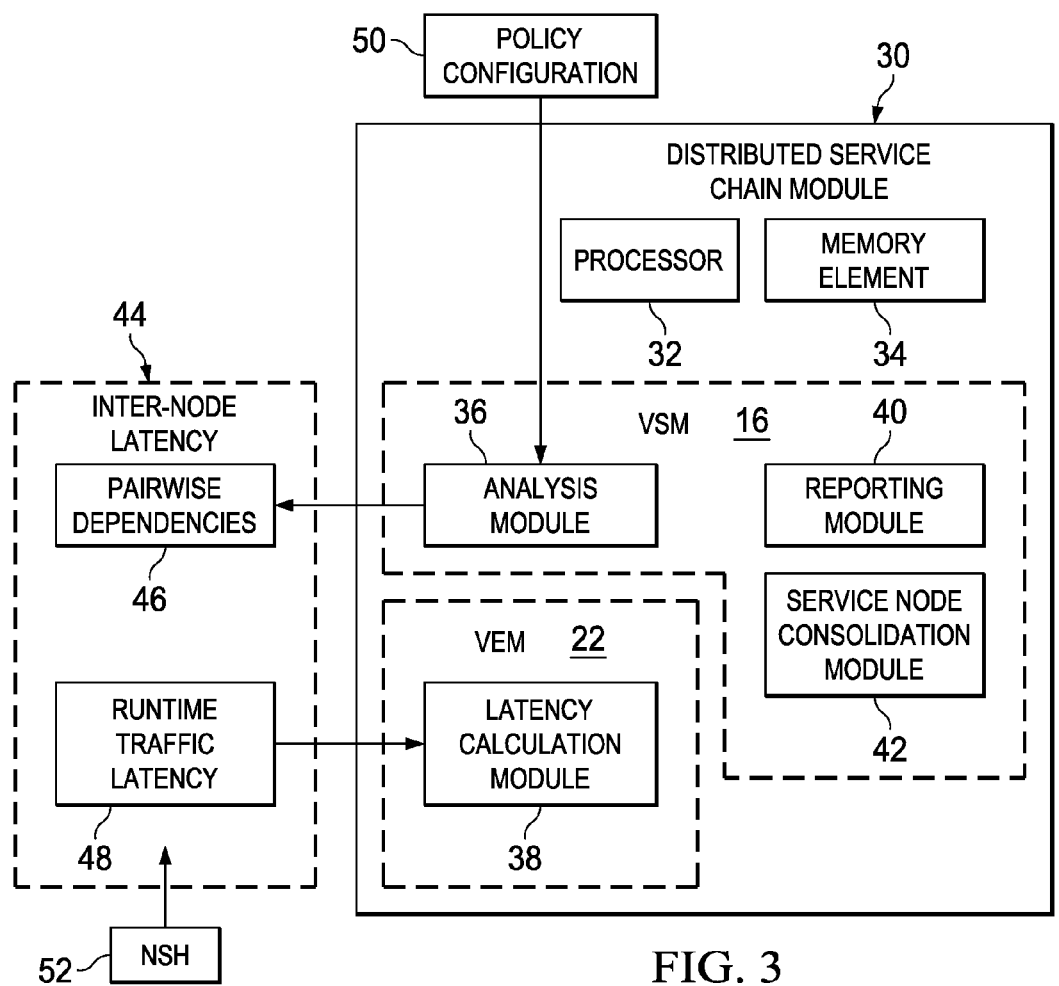
FIG. 3 is a simplified block diagram illustrating yet other example details of an embodiment of the communication system.

Turning to FIG. 3, FIG. 3 is a simplified block diagram illustrating example details that may be associated with an embodiment of communication system 10. A distributed service chain module 30 may be provided in network 12. Distributed service chain module 30 may include a processor 32, a memory element 34, an analysis module 36, a latency calculation module 38, a reporting module 40, and a service node consolidation module 42. In some embodiments, analysis module 36, reporting module 40, and service node consolidation module 42 may be provisioned in VSM 16; latency calculation module 38 may be provisioned in each VEM 22 in network 12. Inter-node latency 44 may comprise pairwise dependencies 46 and runtime traffic latency 48. Pairwise dependencies 46 between distributed service chains may be extracted by analysis module 36 from policy configuration 50 associated with each distributed service chain. Runtime traffic latency 48 may be aggregated by latency calculation module 38 from the path history of packets traversing each distributed service chain by inspecting NSH 52 in the packet header of each packet. Analysis module 36 may further compute a modified location of service nodes in the network to reduce inter-node latency 44.

In some embodiments, reporting module 40 may report the modified locations to a suitable management entity (e.g., in a form of a log file), if appropriate. The management entity may include any suitable management application executing on a network element within or outside network 12. The management entity may be responsible for service node placement and migration. A network administrator may manually move the service node based on the modified locations listed in the log file. In another example, the network administrator may configure VSM 16 to modify the service node location as provided in the reported log file. In other embodiments, service node consolidation module 42 may force modifications to service node locations according to the reduction in inter-node latency 44.

Figure 4:
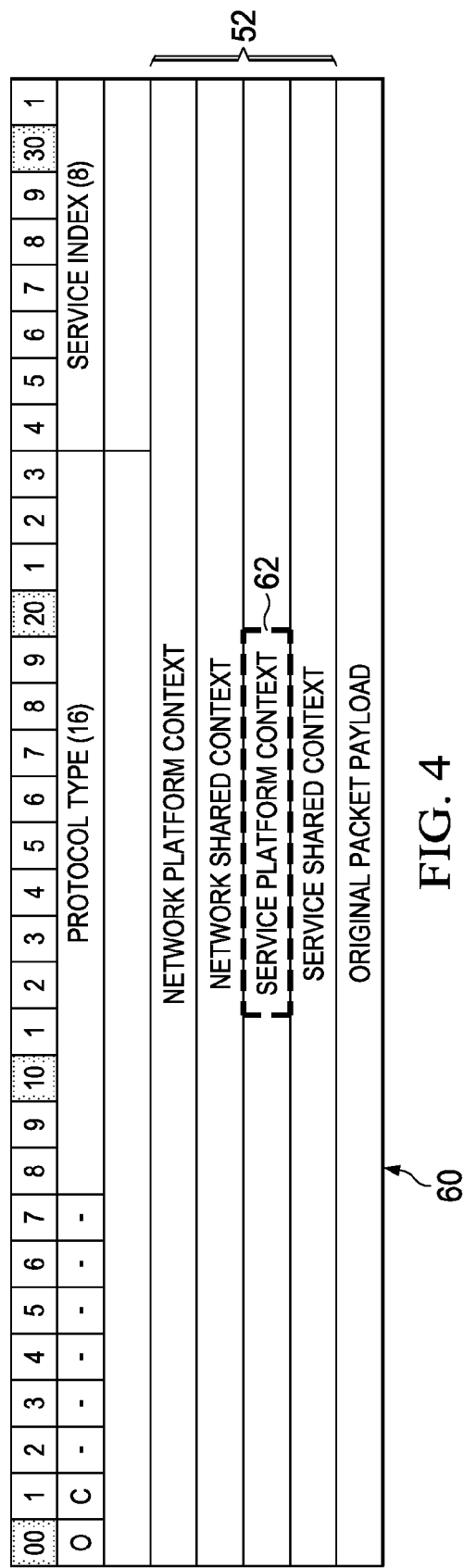
FIG. 4 is a simplified block diagram illustrating yet other example details of an embodiment of the communication system.

Turning to FIG. 4, FIG. 4 is a simplified block diagram illustrating details of an example packet 60 according to an embodiment of communication system 10. Example packet 60 may include a packet header comprising NSH 52. In addition to path information, NSH 52 also carries metadata used by network elements and/or services. NSH 52 may be added to example packet 60 to create a service plane. Packet 60 including NSH 52 may be encapsulated in an outer header for transport. In various embodiments, NSH 52 may include a 64-bit base header, and four 32-bit context headers. While each context header may include various specific functions, a service platform context 62 in NSH 52 may be used to indicate path history of example packet 60. According to various embodiments, VEM 22 may inspect service platform context 62 to determine runtime traffic latency of service nodes in the network.

Figure 5:
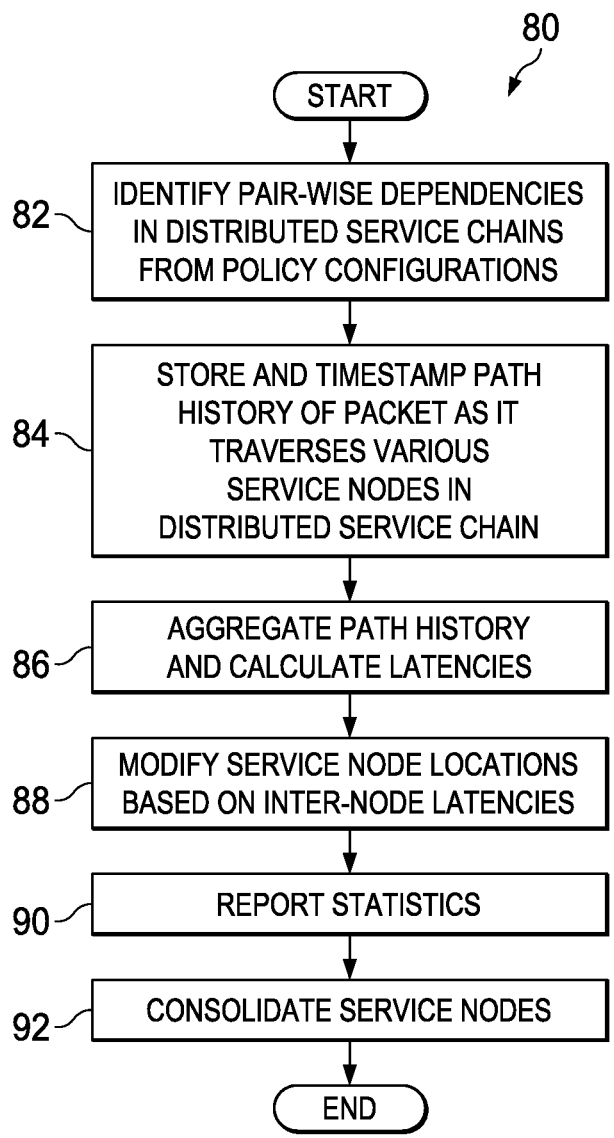
FIG. 5 is a simplified flow diagram illustrating example operations that may be associated with an embodiment of the communication system.

Turning to FIG. 5, FIG. 5 is a simplified flow diagram illustrating example operations 80 that may associated with example embodiments of communication system 10. At 82, VSM 16 may identify pairwise dependencies 46 (e.g., shared or recurring sequences of service nodes in distributed service chains) from respective policy configurations 50. At 84, VEM 22 at each service node may store and timestamp the path history of each packet as it traverses various service nodes in the distributed service chain. At 86, the last VEM in each distributed service chain may aggregate the path history and calculate the runtime traffic latencies 48. At 88, VSM 16 may modify service node locations based on inter-node latency 44 (comprised of pairwise dependency 46 and runtime traffic latency 48). At 90, VSM 16 may report statistics (e.g., of modified service node locations) in a suitable log file. At 92, VSM 16 may consolidate service nodes as appropriate.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, DVS 14. In some embodiments, one or more of these features may be implemented in hardware, provided external to these elements, or consolidated in any appropriate manner to achieve the intended functionality. The various network elements (e.g., DVS 14, VSM 16, VEM 22)

may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, DVS 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 34) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 32) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method, comprising:
receiving information about inter-node latency of a distributed service chain in a network environment comprising a distributed virtual switch (DVS), wherein the inter-node latency is derived at least from a network service header (NSH) portion of packet headers of respective packets traversing a plurality of service nodes comprising the distributed service chain, wherein the NSH creates a service plane comprising a service platform context and at least one of a network platform context, a network shared context, and a service shared context, wherein a path history of the corresponding packet is stored and timestamped in the service platform context field of the packet as it traverses various nodes in the distributed service chain, wherein the distributed service chain comprises an ordered sequence of services provided by the plurality of service nodes, the services providing packet manipulation beyond conventional packet forwarding;

identifying pairwise dependencies between the services; and modifying locations of the service nodes in the DVS to reduce the inter-node latency in view of the pairwise dependencies.

2. The method of claim 1, further comprising:

aggregating information about the inter-node latencies from a plurality of distributed service chains in the network environment, wherein the locations of service nodes associated with the plurality of distributed service chains are determined to reduce the aggregated inter-node latencies.

3. The method of claim 1, wherein a virtual Ethernet Module (VEM) of the DVS stores and time-stamps a path history of each packet in the service platform context field of the NSH portion of the respective packet header.

4. The method of claim 3, wherein a last VEM in the distributed service chain calculates runtime traffic latencies from the path history time-stamped in the packet headers of respective packets and sends the calculated runtime traffic latencies to a virtual supervisor module (VSM) managing the DVS.

5. The method of claim 4, wherein the VSM further identifies pairwise dependencies from a policy configuration of each distributed service chain in the network environment.

6. The method of claim 5, wherein the pairwise dependencies comprise at last one selection from a group consisting of: a common sequence of service nodes, and weighted paths based on service level agreements with corresponding tenants.

7. The method of claim 5, wherein the information about inter-node latency comprises the pairwise dependencies and the measured runtime traffic latencies.

8. The method of claim 1, further comprising:

reporting the modified locations to a management entity responsible for service node placement and migration.

9. The method of claim 1, further comprising:

consolidating the service node locations comprising at least one action selected from a group consisting of: co-location to the modified locations, live migration to the modified locations and instantiation of new service nodes at the modified locations.

10. The method of claim 1, further comprising co-locating at least two service nodes at a common VEM.

11. Non-transitory tangible media that includes instructions for execution, which when executed by a processor, is operable to perform operations comprising:

receiving information about inter-node latency of a distributed service chain in a network environment comprising a distributed virtual switch (DVS), wherein the inter-node latency is derived at least from a network service header (NSH) portion of packet headers of respective packets traversing a plurality of service nodes comprising the distributed service chain, wherein the NSH creates a service plane comprising a service platform context and at least one of a network platform context, a network shared context, and a service shared context, wherein a path history of the corresponding packet is stored and timestamped in the service platform context field of the packet as it traverses various nodes in the distributed service chain, wherein the distributed service chain comprises an ordered sequence of services provided by the plurality of service nodes, the services providing packet manipulation beyond conventional packet forwarding;

identifying pairwise dependencies between the services; and modifying locations of the service nodes in the distributed virtual switch to reduce the inter-node latency in view of the pairwise dependencies.

12. The media of claim 11, wherein the operations further comprise:

storing and time-stamping a path history of each packet in the service platform context field of the NSH portion of the respective packet header.

13. The media of claim 12, wherein a VEM of the DVS stores and time-stamps the path history in the service platform context field of the NSH portion of the respective packet header.

14. The media of claim 13, wherein a last VEM in the distributed service chain calculates runtime traffic latencies from the path history time-stamped in the packet headers of respective packets and sends the calculated runtime traffic latencies to a VSM managing the DVS.

15. The media of claim 14, wherein the VSM further identifies pairwise dependencies from a policy configuration of each distributed service chain in the network environment.

16. An apparatus, comprising:

a distributed service chain module in a DVS network environment comprising a memory element for storing data and a processor, wherein the processor executes instructions associated with the data, wherein the processor and the memory element cooperate, such that the apparatus is configured for:

receiving information about inter-node latency of a distributed service chain in the DVS network environment, wherein the inter-node latency is derived at least from a network service header (NSH) portion of packet headers of respective packets traversing a plurality of service nodes comprising the distributed service chain, wherein the NSH creates a service plane comprising a service platform context and at least one of a network platform context, a network shared context, and a service shared context, wherein a path history of the corresponding packet is stored and timestamped in the service platform context field of the packet as it traverses various nodes in the distributed service chain, wherein the distributed service chain comprises an ordered sequence of services provided by the plurality of service nodes, the services providing packet manipulation beyond conventional packet forwarding;

identifying pairwise dependencies between the services; and modifying locations of the service nodes in the DVS to reduce the inter-node latency in view of the pairwise dependencies.

17. The apparatus of claim 16, wherein the operations further comprise:

storing and time-stamping a path history of each packet in the service platform context field of the NSH portion of the respective packet header.

18. The apparatus of claim 17, wherein a VEM of the DVS stores and time-stamps the path history in the service platform context field of the NSH portion of the respective packet header.

19. The apparatus of claim 18, wherein a last VEM in the distributed service chain calculates runtime traffic latencies from the path history time-stamped in the packet headers of respective packets and sends the calculated runtime traffic latencies to a VSM managing the DVS, wherein the distributed service chain module comprises the VSM.

20. The apparatus of claim 19, wherein the VSM further identifies pairwise dependencies from a policy configuration of each distributed service chain in the network environment.

* * * * *